United States Patent [19]

Hudson et al.

[11] Patent Number: 4,776,536
[45] Date of Patent: Oct. 11, 1988

[54] INTEGRATED AIRCRAFT FUEL THERMAL MANAGEMENT SYSTEM

[75] Inventors: William A. Hudson, Fountain Valley; Mark L. Levin, Hermosa Beach, both of Calif.

[73] Assignee: Rockwell International Corporation, El Segundo, Calif.

[21] Appl. No.: 51,527

[22] Filed: May 19, 1987

[51] Int. Cl.$^4$ .............................................. B64D 37/34
[52] U.S. Cl. .............................. 244/135 R; 244/117 A
[58] Field of Search ............. 244/117 A, 135 R; 62/7; 60/730, 736, 39.181; 165/42; 123/557

[56] References Cited

U.S. PATENT DOCUMENTS

| | | | |
|---|---|---|---|
| 3,779,007 | 12/1973 | Lavash | 60/736 |
| 4,020,632 | 5/1977 | Coffinberry et al. | 60/736 |
| 4,505,124 | 3/1985 | Mayer | 244/135 R |
| 4,696,156 | 9/1987 | Burr et al. | 60/736 |
| 4,705,100 | 11/1987 | Black et al. | 60/736 |

FOREIGN PATENT DOCUMENTS 687872  2/1953  United Kingdom ............ 244/135 R

Primary Examiner—Galen L. Barefoot
Assistant Examiner—Rodney Corl
Attorney, Agent, or Firm—Harold C. Weston; Charles T. Silberberg; Lawrence N. Ginsberg

[57] ABSTRACT

Aircraft thermal management is optimized by integration of normally separate airframe and engine fuel transfer/heat sink systems into a composite heat sink and secondary power source. Fuel temperature is controlled to limits set by coking and varnishing within the engine fuel nozzles. Fuel in excess of engine demand is returned to the aircraft's main fuel tank after being cooled by either aerodynamic surfaces or by a "fuel to ram-air" heat exchanger. Airframe and engine systems are cooled through use of fuel as coolant passing through heat exchangers mounted in the feed line from the "cool" main tank to the engines. The Engine Electronic Control Unit (ECU) is cooled by the airframe Environmental Control System (ECS) increasing its operational reliability. Controlling engine burn fuel to nozzle temperature limits results in lower main tank fuel temperature, less fuel boiloff, smaller sized ECS, greater heat sink capacity and less dependence on supplemental ram air.

2 Claims, 3 Drawing Sheets

INTEGRATED AIRCRAFT FUEL THERMAL MANAGEMENT SYSTEM

BACKGROUND OF THE INVENTION

This invention relates to fuel-cooled aircraft operational subsystems, but, more particularly, to a system which increases an aircraft's heat capacity by integrating airframe and engine thermal management systems, utilizing the aircraft's fuel as both coolant and heat sink.

The high specific heat and density of fuel, compared with that of ram air, makes fuel an attractive onboard heat sink and allows use of smaller heat exchangers in airframe subsystems. Moreover, fuel, in its closed containment system, is an inherently clean heat sink (respecting radiation, biological and chemical contamination) and entails no penalty of increased radar cross section, as do ram air systems. During aerodynamically "hot" flight conditions, fuel temperature is cooler than that of ram air and more compatible with subsystem temperature limits, making fuel more attractive as a heat sink than such ram air. In addition, it is a heat sink that is consumed through useful combustion in the engine.

Although fuel has advantages over ram air as a heat sink, it has certain limitations. One of these is that the temperature of jet fuels must be kept below specified maximums at the engine combustor nozzles to prevent fuel coking, gumming, and varnishing. The maximum permissible temperature for JP-4 and JP-5 fuels is 325° F. Also, as fuel temperatures and/or flight altitudes increase, normal fuel tank pressures can result in excessive boiloff. Prevention of boiloff by increasing tank pressure results in structural weight penalties.

Supersonic and hypersonic aircraft that are aerodynamically "hot" may use fuel to absorb frictional heat produced by the airstream passing over wing and fuselage surfaces. One prior art method of using fuel as such a heat sink makes use of a catalyst. The catalyst promotes an endothermic chemical reaction which denydronates the fuel, allowing it to absorb more heat. Such a method is disclosed in U.S. Pat. No. 3,438,602 to Noddings, et al. This type of system chemically breaks down the fuel into smaller molecules and alters the fuel's characteristics as a propellant. Such a system requires temperatures of 700 to 1000 degrees F. for operation and is consequently limited in application to high supersonic or hypersonic aircraft.

Other prior art systems for heat management in high speed aircraft incorporate fuel refrigeration systems. A major disadvantage of such systems is that additional power is required for the refrigeration itself, and this places a drain on energy producing systems of the aircraft. A further disadvantage of such systems is that they control the temperature of fuel at the engine inlet rather than at the engine fuel nozzles, where fuel temperatures are most critical. Such a system is disclosed in U.S. Pat. No. 4,505,124 to Mayer.

Other prior art aircraft heat management systems use fuel to cool aircraft subsystems as well as the airframe. An example of such is presented is U.S. Pat. No. 4,273,304 to Frosch, et al. The Frosch system, however, refrigerates the fuel, necessitating additional power for the refrigeration system, as with some of the other prior art systems discusse above. Another disadvantage of Frosch cooling is that it requires higher quantities of heat absorbing fuel as cooling demands of the airframe and aircraft subsystem increase. Thus, near the end of a given mission, when fuel quantity is minimal, this system has a significantly reduced cooling capability.

SUMMARY OF THE INVENTION

It is a primary object of this invention to increase aircraft heat sink capacity by integrating airframe cooling and engine thermal management systems.

It is another object of the present invention to provide an aircraft thermal management system which minimizes the size of any required ram air heat exchanger system.

Still another object of the present invention is to provide an aircraft thermal management system which controls and optimizes fuel temperature at the engine fuel nozzles.

A further object of this invention is to lower main fuel tank temperature and the associated pressure required to prevent fuel bailoff.

Another object of this invention is to utilize energy in high pressure fuel returning from the engine to the main tank by powering a hydraulic turbine.

The system of the present invention, using the fuel itself as a heat sink, directs cool fuel first to those aircraft subsystems where operating temperatures are most critical, and subsequently, to those where they are less so. For example, since the aircraft environmental control system operates best at low temperatures, it receives cool fuel directly from the main fuel tank and since hydraulic systems are generally temperature insensitive, they are the last to receive it before it is eitner burned in tne engine or returned to the main tank.

Another feature of this system is that it cools the temperature sensitive engine electronic control unit by the airframe environmental control system. This increases realibility of the ECU and allows higher engine inlet fuel temperatures, permitting the fuel to be effective as a heat sink at higher temperatures than would otherwise be possible.

Because fuel temperatures are controlled at the engine fuel nozzles and maintained at a maximum there (just below fuel coking limits), waste heat consumed by the egines is maximized. This provides ennanced efficiency of the entire fuel heat sink system. This higher operating temperature also increases the heat sink capacity at completion of the aircraft mission, wnen residual fuel is at a minimum.

All fuel in excess of engine demand is routed back to the main fuel tank. Since the fuel returning to the main fuel tank is downstream of the engine fuel pump and under high pressure, it can be utilized as a power source for other aircraft subsystems by flowing it through turbines, or other impeller devices.

Based on the foregoing, it is apparent that the integrated airframe and engine fuel thermal management system of the present invention results in optimal use of aircraft fuel as a heat sink and provides more effective temperature control of the various aircraft subsystems, especially near mission completion, when fuel supplies are low and only a small amount of fuel is available to absorb heat from them. Tnus, the system of the present invention results in improved cooling of aircraft operational subsystems while keeping fuel temperatures low enough to allow such fuel to function as an effective and efficient heat sink.

DETAILED DESCRIPTION OF THE PREFERRED EMBODIMENT

Figure 1:
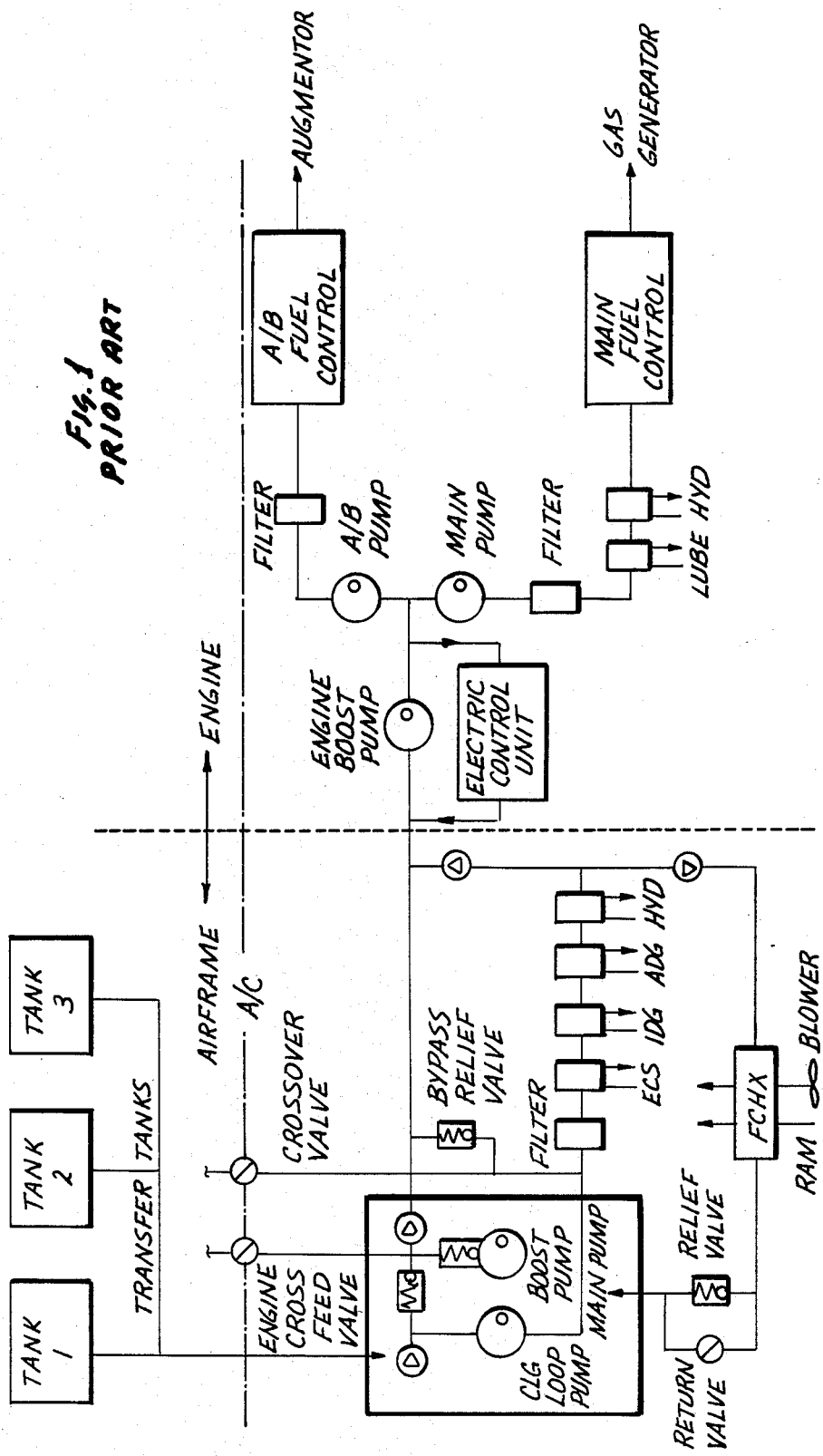
FIG. 1 is a schematic presentation of a prior art thermal management system in which fuel used as coolant and heat sink is limited in temperature by demands of the environmental control system and the engine inlet temperature.
Figure 2:
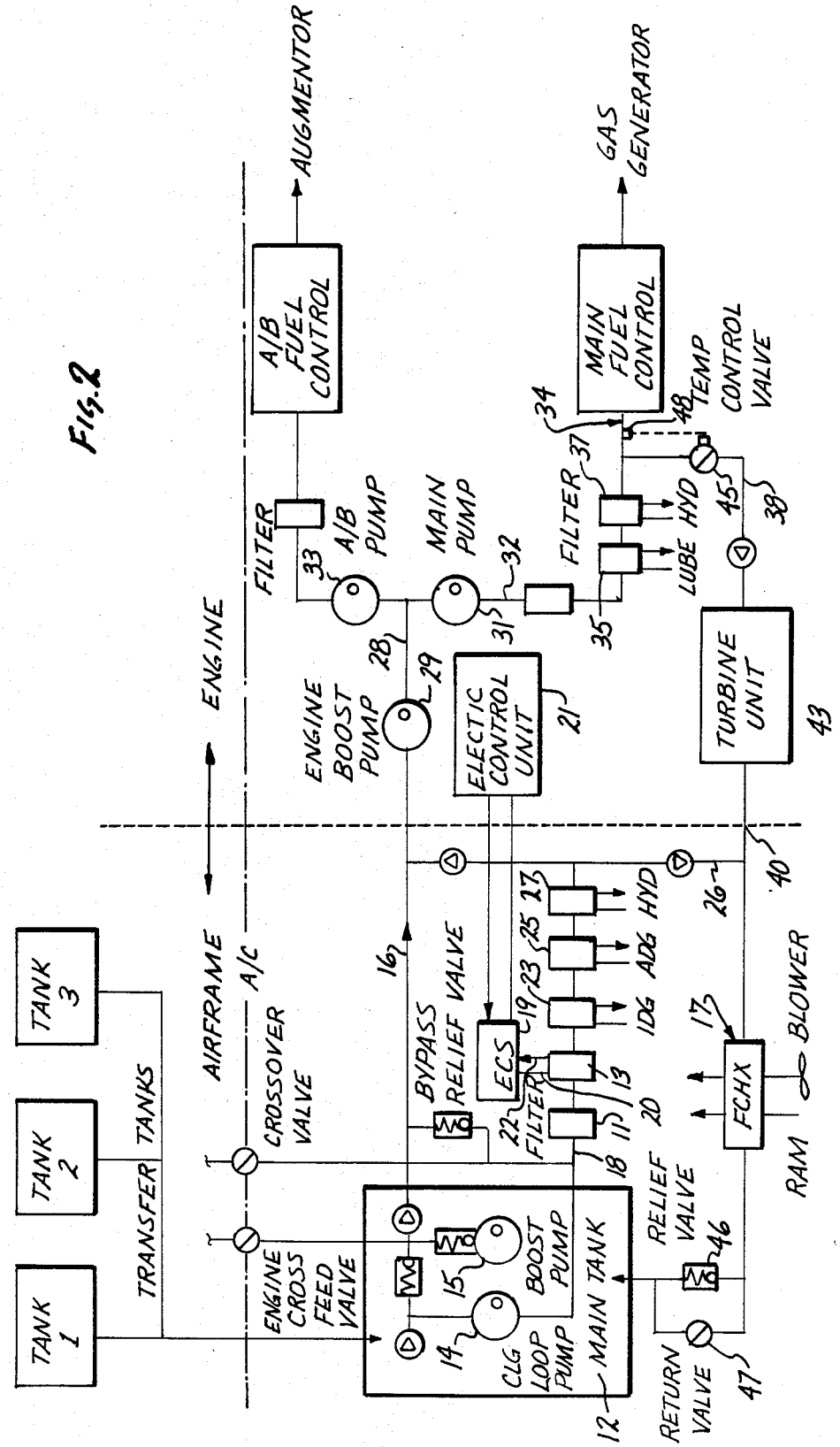
FIG. 2 is a schematic of the present invention showing its application to typical high performance aircraft where temperature of the coolant fuel is allowed to reach the maximum nozzle inlet limit of more than 300 degrees F.
Figure 3:
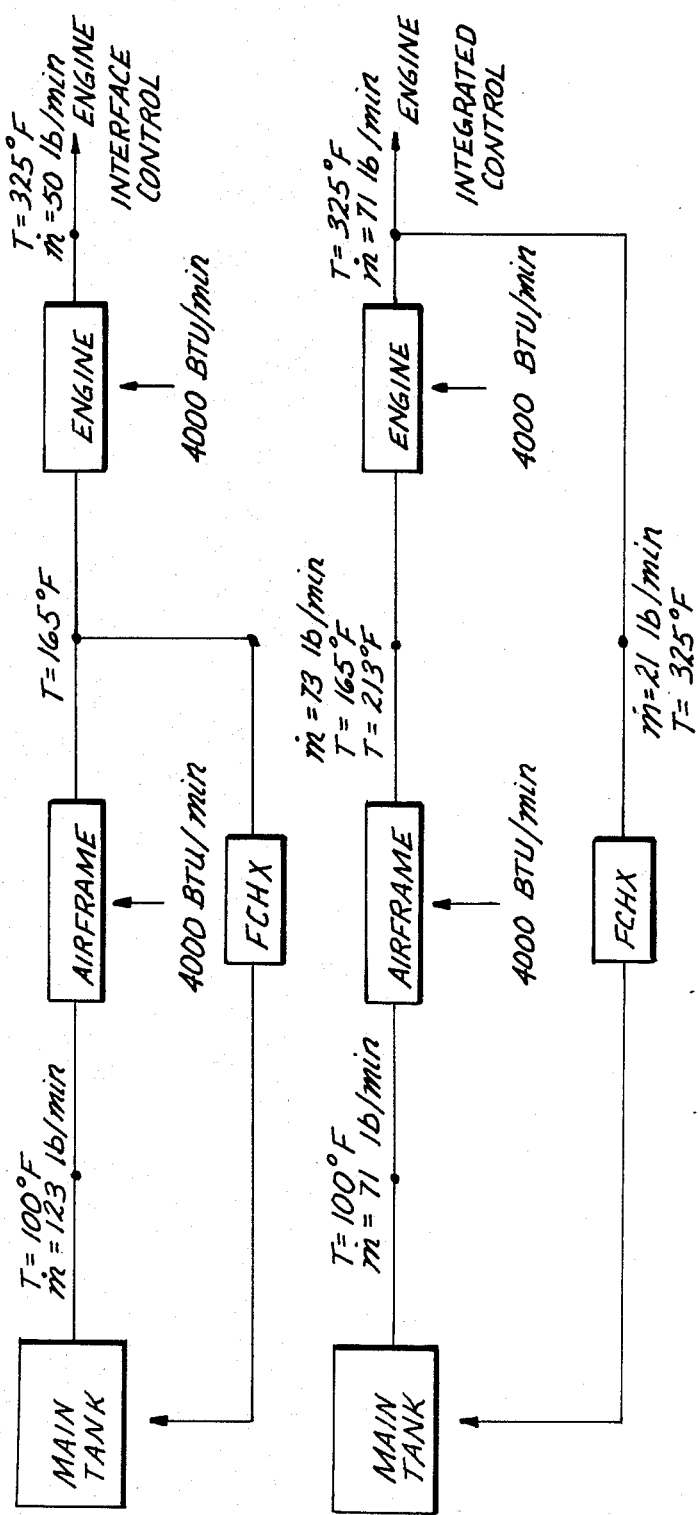
FIG. 3 is a block diagram comparing the parameters, i.e., temperature, caloric heat and flow rate, of fuel returning to the main fuel tank in the integrated control system of this invention, with those of the interface temperature control of prior art systems.

Referring now to the drawings, FIG. 2 is a schematic illustration of the system of the present invention used for transfer of excess heat from aircraft subsystems. Aircraft fuel is used as the cooling medium for all subsystems shown in FIG. 2.

Fuel in main tank 12 is pressurized by cooling loop pump 14 and main tank boost pump 15. From main tank 12, fuel is pumped via conduit means, referred to hereafter as "fuel lines", here, fuel line 18, through filter 11 to heat exchangers of the Environmental Control System (ECS) 13, Integrated Drive Generator (IDG) 23, Accessory Drive Gearbox (ADG) 25, and Airframe Hydraulic System (Hyd) 27. ECS 19 cools the Engine Electric Control Unit (ECU) 21.

Since subsystems 23, 25 and 27 do not have critical temperature requirements, they are cooled separately by fuel which has already conditioned the more critical units ECS 19 and ECU 21. Fuel from subsystems 23, 25, and 27 normally flows through line 24 to line 16. Line 16 is a high flow rate make-up line which supplements the flow through the cooling loop containing the heat exchangers of subsystems 13, 23, 25 and 27. Flow in line 16 is typical during after-burner operation. Fuel from boost pump 29 passes through line 28 to main engine pump 31 and after-burner pump 33. From main pump 31, fuel is passed through line 32 into engine lubrication system 35 and engine hydraulic system 37 heat exchangers. After cooling engine subsystems 35 and 37, fuel branches out into lines 34 and 36. Line 34 carries fuel to Main Fuel Control Unit 39. Flow through line 36 is regulated by fuel temperature control valve 45, which maintains the temperature in line 34 to approximately 325° F. or just below the coking limit of JP-4 fuel. After passing through temperature control valve 45, fuel passes through line 38 to turbine 43. Since fuel in line 38 is at high pressure (approximately 1200 PSI), its flow is used to turn turbine 43, providing mechanical power to other aircraft systems.

Fuel flows through line 40 and passes through a fuel cooling heat exchanger (FCHX) 17 which may be a ram air system (optionally including a blower) or aerodynamically cooled structural skins. The cooled fuel is then reintroduced to main tank 12. Flow through line 26 is controlled by valve 47 which may operate during ground operation with an Auxiliary Power Unit (APU), not shown, or during emergency flight conditions.

Temperature control valve 45 maintains a constant fuel temperature to gas generator 47, i.e., at the engine. This temperature is determined by coking and varnishing limits for the particular fuel being used. The temperature control valve 45 is provided feedback by a temperature sensor 48, located at line 34. During flight, when fuel temperature increases with high subsystem heat rejection and low engine fuel consumption, valve 45 opens to increase fuel flow through line 38 back to main tank 12. Since control valve 45 opens downstream of main pump 31, which keeps the fuel at high pressure (10000-1500 psi), fuel being returned to main tank 12 is also at high pressure, rendering it available for mechanical work. Returning fuel drives turbine 43 to provide power for aircraft subsystems. It is also at a higher temperature (approximately 325° F. for JP-4 fuel) and lower flow rate, than that of prior art aircraft fuel heat sink systems. This higher temperature and lower flow rate results in more efficient heat removal at FCHX 17.

In addition to controlling temperature of fuel going to gas generator 47, temperature control valve 45 is also responsive to temperatures of subsystems 19, 23, 25, 27, 35 and 37 by increasing fuel flow in line 38 for enhanced cooling of the subsystems.

Although the within thermal management system has been described in relation to its use with high performance aircraft, many variants utilizing the inventive feature of engine inlet nozzle temperature control of coolant fuel, are contemplated by the disclosure and will be apparent to those skilled in this art. Accordingly, it is intended that all variant embodiments, modifications and alternatives falling within the spirit and scope of the thermal management system of this invention be included in the class covered by the appended claims.

What is claimed is:

1. An integrated aircraft fuel thermal management system for an aircraft having, an engine with an engine gas generator, an engine fuel boost pump and an electric control unit (ECU);

an airframe;

a main fuel tank;

fuel-cooled airframe and engine subsystems, each subsystem having a heat exchanger associated therewith, one of said airframe subsystems being an environmental control system (ECS);

a fuel cooling heat exchanger for transferring heat from fuel to ram air; and, airframe and engine fuel pumps, the integrated aircraft fuel thermal management system, comprising:

(a) first conduit means for directing fuel from said main fuel tank to said engine fuel boost pump, said first conduit means bypassing the heat exchangers associated with the fuel-cooled airframe subsystems to prevent excess pressures in those heat exchangers during after-burner operation;

(b) second conduit means for directing fuel from said main fuel tank through the heat exchangers associated with the fuel-cooled airframe subsystems and to said engine fuel boost pump;

(c) third conduit means for directing fuel from said engine gas generator through said fuel cooling heat exchanger to said main fuel tank;

(d) a temperature control valve located on said third conduit means upstream of said fuel cooling heat exchanger for controlling the temperature of fuel flowing into said engine gas generator to the fuel coking temperature limit by regulating the flow in excess of engine demand through said third conduit means, thereby maximizing the amount of heat rejected to the engine; and, (c) fourth conduit means for directing coolant from the ECS to the ECU to provide independent cooling of the ECU at reduced temperatures thereby enhancing ECU reliablility and increasing allowable engine inlet temperatures.

2. The system of claim 1, further including a turbine located within said third conduit means and upstream of said fuel cooling heat exchanger for providing mechanical power to other aircraft systems while necessarily reducing inlet pressure to said fuel cooling heat exchanger and said main fuel tank.

* * * * *